(12) United States Patent
Appleby et al.

(10) Patent No.: US 8,219,027 B2
(45) Date of Patent: Jul. 10, 2012

(54) PROXIMITY BASED SMART COLLABORATION

(75) Inventors: Richard M. Appleby, Hampshire (GB); Bharat V. Bedi, Hampshire (GB); Kevin C. Brown, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 415 days.

(21) Appl. No.: 12/393,733

(22) Filed: Feb. 26, 2009

(65) Prior Publication Data

US 2010/0216402 A1 Aug. 26, 2010

(51) Int. Cl.
*H04B 7/00* (2006.01)

(52) U.S. Cl. .................... 455/41.2; 455/41.3

(58) Field of Classification Search ............... 455/41.2, 455/41.3, 419
See application file for complete search history.

(56) References Cited

U.S. PATENT DOCUMENTS

| | | | |
|---|---|---|---|
| 5,043,736 A | 8/1991 | Darnell et al. | |
| 5,579,535 A | 11/1996 | Orlen et al. | |
| 5,648,768 A | 7/1997 | Bouve | |
| 5,774,803 A | 6/1998 | Kariya | |
| 5,999,126 A | 12/1999 | Ito | |
| 6,014,090 A | 1/2000 | Rosen et al. | |
| 6,091,956 A | 7/2000 | Hollenberg | |
| 6,097,313 A | 8/2000 | Takahashi et al. | |
| 6,138,072 A | 10/2000 | Nagai | |
| 6,151,309 A | 11/2000 | Busuioc et al. | |
| 6,243,030 B1 | 6/2001 | Levine | |
| 6,314,365 B1 | 11/2001 | Smith | |
| 6,317,605 B1 | 11/2001 | Sakuma | |
| 6,349,203 B1 | 2/2002 | Asaoka et al. | |
| 6,353,398 B1 | 3/2002 | Amin et al. | |
| 6,452,498 B2 | 9/2002 | Stewart | |
| 6,587,759 B2 | 7/2003 | Obradovich et al. | |
| 6,798,358 B2 | 9/2004 | Joyce et al. | |
| 6,973,318 B2 | 12/2005 | Jambhekar et al. | |
| 7,054,619 B2 | 5/2006 | Kettunen et al. | |
| 7,058,698 B2 | 6/2006 | Chatterjee et al. | |
| 7,103,369 B2 | 9/2006 | Sato et al. | |
| 7,203,597 B2 | 4/2007 | Sato et al. | |
| 7,219,153 B1 | 5/2007 | Day | |
| 7,227,475 B1 | 6/2007 | Provenzano | |
| 7,289,904 B2 | 10/2007 | Uyeki | |
| 7,305,244 B2 | 12/2007 | Blomqvist et al. | |
| 2004/0048605 A1 | 3/2004 | Schaefer et al. | |
| 2006/0258287 A1* | 11/2006 | Bidet et al. | 455/41.2 |

FOREIGN PATENT DOCUMENTS

EP 1133119 9/2001

OTHER PUBLICATIONS

Gizmodo, Music: Smart Party Wireless DJ System Will Get Playlist Votes From Your Trousered MP3 Player, http://gizmodo.com/347077/smart-party-wireless-dj-system-will-get-playlist-votes-from-your-trousered-mp3-player, Accessed Feb. 19, 2008.

* cited by examiner

*Primary Examiner* — Robert Pascal
*Assistant Examiner* — Khiem Nguyen
(74) *Attorney, Agent, or Firm* — Scully, Scott, Murphy & Presser, P.C.; Jeanine S. Ray-Yarletts

(57) ABSTRACT

A first device detects one or more devices within communication proximity of the first device, determines one or more actions to perform when said one or more devices are within communication proximity, learns behavior of the first device when said one or more devices are detected to be within communication proximity of the first device and performs said one or more actions.

24 Claims, 3 Drawing Sheets

US 8,219,027 B2

PROXIMITY BASED SMART COLLABORATION

FIELD OF THE INVENTION

The present disclosure relates generally to computer systems for providing collaboration, and more particularly to proximity based smart collaboration.

BACKGROUND OF THE INVENTION

When a meeting takes place between person A and person B, the discussion is usually around a particular topic or theme. Often the conversation will require reference to documents or applications accessible on the person's device such as computer, personal digital assistant (PDA) or phone. While existing collaboration systems or software allow user to convene and collaborate and share documents, they do not automatically detect who or what devices are nearby, for example, in order to automatically setup a collaboration environment or documents for sharing.

U.S. Pat. No. 6,798,358 describes location-based content delivery that provides for delivering content, such as information, advertisements, directions, and news to a mobile terminal based on location. The mobile terminal is configured to determine its location and whether content is available based on internal records. If content is available, the mobile terminal may initiate correspondence with an application server to obtain the content.

BRIEF SUMMARY OF THE INVENTION

A method and system for proximity based smart collaboration are provided. The method in one aspect may include detecting automatically one or more devices within proximity of a first device and determining one or more actions to perform when said one or more devices are within proximity. The method may also include learning behavior of the first device when said one or more devices are detected to be within proximity of the first device, and performing said one or more actions.

A system for proximity based smart collaboration, in one aspect, may comprise a first computer device, a radio frequency device detection module in the first device operable to automatically detect one or more devices within proximity of a first device. The first computer device is further operable to determine one or more actions to perform when said one or more devices are within proximity. The first computer device is also operable to learn behavior of the first computer device when said one or more devices are detected to be within proximity of the first computer device, and the first computer device is further operable to perform said one or more actions.

A program storage device readable by a machine, tangibly embodying a program of instructions executable by the machine to perform the methods of proximity based smart collaboration may be also provided.

Further features as well as the structure and operation of various embodiments are described in detail below with reference to the accompanying drawings. In the drawings, like reference numbers indicate identical or functionally similar elements.

DETAILED DESCRIPTION

System and method are disclosed that allow for a device to be customized based on the proximity of colleagues, friends, family, etc., to enable smarter collaboration between people. The system and method of the present disclosure may configure content based on the proximity of other devices, independent of the location of the device. In one aspect, the content is provided and the device is configured with existing content in a way that facilitates collaboration. Any aspect of the device may be configured or its state changed. For instance, applications running on the device may be stopped or started, parameters on the device may be changed or set or reset. Some examples may include but are not limited to opening a new document, displaying a specific website in the browser, or changing wallpaper or time-zone, etc. Example of change to the configuration of the device may also include but not limited to turning up the volume control or the backlight on the device. In general, a device may learn and behave in a way based on the presence of another device or based on user using that another device in the proximity. The device may be configured, reconfigured or adapted based on other devices that are nearby.

As another example, a hearing aid device may automatically adjust its hearing volume in response to detecting other devices that are nearby. Examples of other devices that are nearby the hearing aid device may include but are not limited to a mobile phone or other mobile devices, for instance, carried by another person. In this example, based on the knowledge of the spoken volume or how loudly the other person carrying the detected device speaks, the volume on the hearing aid may be adjusted appropriately. In yet another example, a projection display may be automatically reconfigured or changed to display appropriate data in response to detecting a device nearby.

Figure 1:
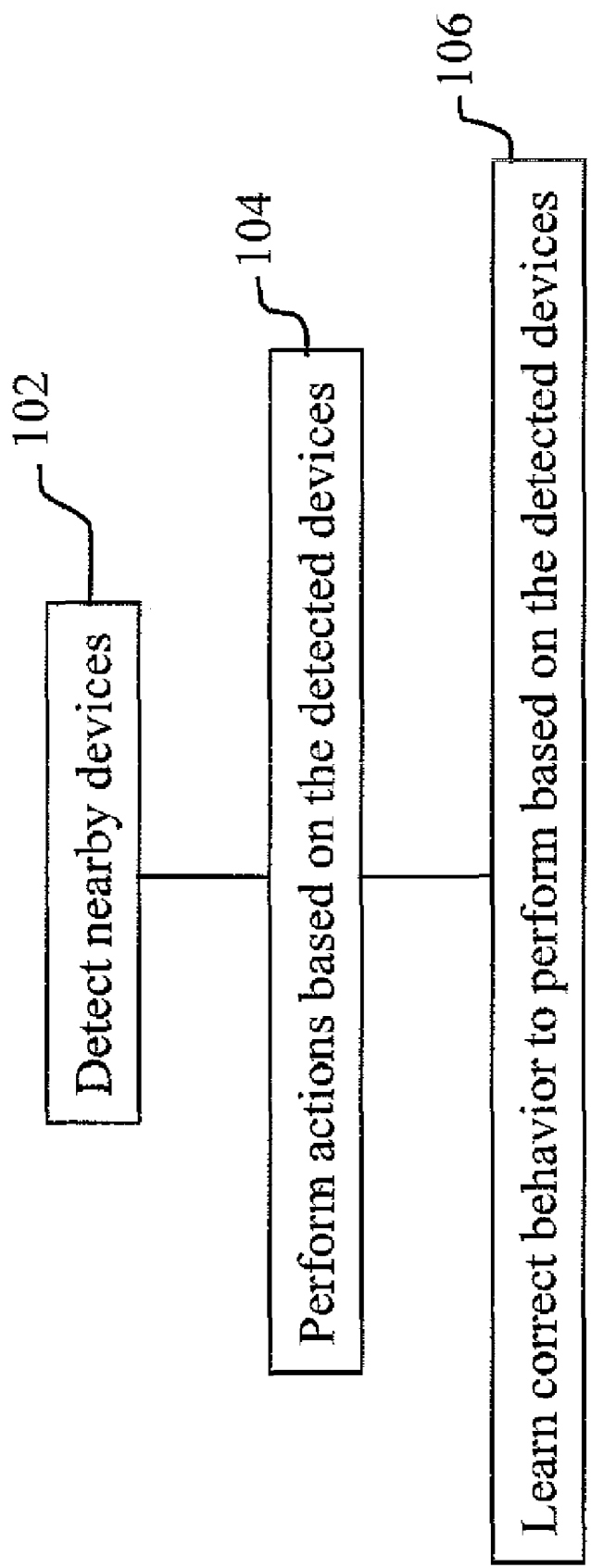
FIG. 1 is a flow diagram illustrating the method of the present disclosure in one embodiment.

FIG. 1 is a flow diagram illustrating the method of the present disclosure in one embodiment. This flow is described in the perspective of a computing device, for example, referred to herein as a first device, for ease of explanation sake. Other devices in the proximity of the first device may be referred to herein as second, third, fourth, etc., devices. It should be understood that the terminology, "first", "second", "third", "fourth", etc. devices are used to refer to devices explained herein for clarity, and do not have any other meanings such as order, etc. attached. Those devices may be of the same type or different types. For instance, both first device and second devices may mobile phones, or first device may be a laptop computer while second device may be a smart phone, etc. The second, third, fourth, etc., devices may be referred to herein collectively as one or more second devices. Examples of devices may include but are not limited to a workstation, a conventional computer or another type of device, mobile phones, laptops, PDAs, or any similar type of electronic devices, a hearing aid device, a projection or projector device, or any other devices that may be reconfigured. At 102, one or more second devices (i.e., other than the first device) in the proximity of the first device are detected. For instance, the first device may detect using methods such as Bluetooth, WiFi, wireless client, and other wireless device discovery methods to determine devices within the communication distance of the first device. Communication distance herein refers to the ability of one device to communicate with or send signals to another device, for instance, wirelessly. For the purposes of this disclosure we define two devices to be in proximity when one device can detect the wireless signal being transmitted by the other device. The range of the proximity will depend on the types of wireless signal being used. In this disclosure we focus on short range wireless signals. For instance, device discovery methods such as Bluetooth methods are well known and therefore, will not be described in further detail herein.

At 104, when another device (also referred to as one or more second devices) is detected in the area of the first device using for instance, existing or will be known methods, one or more changes or actions may be performed in the first device. The changes or actions, for example, may be opening a document, changing to a different web page, changing the order of bookmarks to make frequently used bookmarks (e.g., related to the discovered second device) appear on the top, etc. The changes or actions also may include configuring the first device to restore a previous state of collaboration, associated with the discovered second device and the user using this second device.

In one embodiment, multiple different states may be stored and restored, wherein each of the multiple different states are associated with or related to a different device. This way, different ways of collaboration between different devices or individuals using those devices may be implemented. For instance, when device A detects device B, a document for discussion may be opened; when device A detects device C, a web page and whiteboard sharing can be resumed; when device A detects each of the devices B, C, D, E and F, the last team meeting minutes may be opened.

At 106, the first device may also learn the correct behaviors to perform when one or more second devices are detected in the proximity. For instance, the first device may capture all the interactions between the user and the first device that occur while the second device is in proximity to it. This observation of interactions may be performed for a predetermined period of time, for instance, a day, a week, etc. After this has happened on several occasions, there will be sufficient information captured to allow the first device to determine the common user interactions which occur while the first device in the proximity of the second device. These common interactions can then be carried out automatically by the first device, for instance, without user intervention, whenever the second device subsequently comes into range of the first device.

As an example, the learning of the device behavior when in proximity of another device may be as follows. A first device detects one or more second devices in proximity of the first device. The one or more second devices are recorded, for instance, in the appropriate storage associated with the first device. The first device records actions performed on the first device during the period when the one or more second devices are detected as being in the proximity. Additional information such as the time of day, the duration the one or more second devices remained in proximity, the geographical location (if the first device includes such capability) may be also recorded. The first device builds a list of actions and additional information each time the one or more second devices come into proximity of the first device for a predetermined number of times or period. For instance, the observation may be performed for the first ten occasions that the first and the one or more second devices are within proximity of one another, or for a day or week. This observation period depends on the implementation design, and the present disclosure does not limit it to any particular period. The actions performed over the observation period are recorded or logged, then examined to find one or more common actions that were performed over that period. For instance, actions that always occurred or were performed on the first device while in proximity distance from the one or more second devices are selected. The next time the first device detects the one or more second devices within its proximity, the first device automatically performs those selected actions. In another aspect, the selected actions may be further filtered based on other criteria such as the time of day, geographic location, etc. For example, actions to perform automatically on the first device may be selected based on whether those same actions were performed previously on the first device when in proximity of the one or more second devices on that time of the day. Any known or will be known pattern matching techniques may be utilized to select the actions to perform based on the previously occurred actions.

In another aspect, there may be devices nearby that are detected, i.e., within the communication proximity, but the first device usually does not collaborate with the detected device. This may happen, for example, in situations where a colleague is situated at a nearby desk but does not necessarily work or collaborate with another colleague. The system and method of the present disclosure may learn that this colleague's device (even if it is detected as being in the proximity) need not be connected to the first device and no configurations or changes need to occur when this colleague's device is detected. For instance, if the determination may be made for a predetermined period or number of times, no collaboration actions occurred on the first device even when in proximity with the second device. In another aspect, the first device may have an exclusionary list, which the first device may look up to determine whether actions should be prevented from being performed even in response to detecting another device. The exclusionary list may include one or more device identifications. If the first device detects one or more of the devices listed in the exclusionary list, there is no need to automatically change or reconfigure the first device. A user of the first device, for instance, may create or update this exclusionary list.

Yet another way of learning appropriate configurations is if a new device is detected in the proximity, and the user of the first device that detected the new device stops work. In this scenario, it is likely that the user of the first device is talking to the owner or user of the detected device. If the new detected device is still present in proximity to the first device and the user of the first device opens a document or a web page, it is likely that the user is working on the content. This can be recorded in a register, so that when the same device is detected again, this document or web page can be bookmarked, for instance, on an easy-to-reach menu on the first device, or opened, with or without confirmation of the user of the first device, depending on the user set up.

Changes or actions may extend beyond the device profile, and may include for example, updating the status message on a chat program on the first device, for example, "talking to Bill", putting a phone on call forward, sending a message to a third party, or even changing the music which is playing and dimming the room lighting. If the two devices (or more) all implement the method of the present disclosure, each device detects the other(s) and configures each respective device accordingly.

In another aspect, a user using the first device may manually configure the appropriate action to perform, for instance, in response to being notified by the first device that a second device is nearby. For example, if the first device detects Bob's phone (second device) is nearby, the user may manually open a web page associated with Bob, e.g., www.bob.com.

Figure 2:
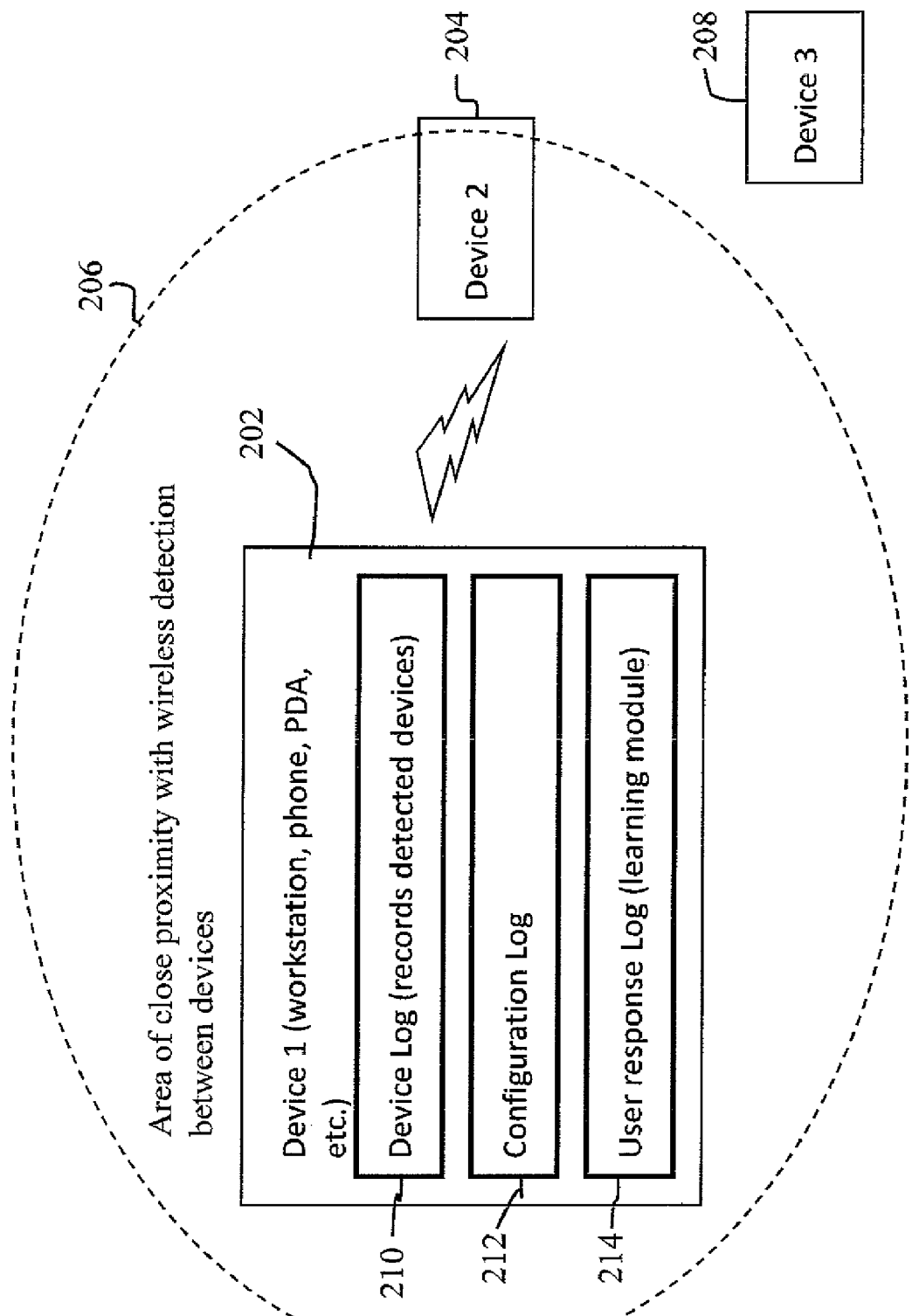
FIG. 2 is a system diagram illustrating device components of the present disclosure in one embodiment.

FIG. 2 is a system diagram illustrating device components of the present disclosure in one embodiment. In the figure, two devices, Device 1 (202) and Device 2 (204) are shown to be within the proximity range (206) and Device 3 (208) is outside this proximity range. Device 1 (202) implementing the method of the present disclosure detects one or more second devices (e.g., 204) within the proximity detection range (206) and logs the detected devices, for instance, by their identifications. Device 1 (202) may also keep monitoring how long Device 2 (204) stays within range and log the timing or duration period accordingly. If Device 2 (204) also implements the method of the present disclosure, Device 2 (204) may also detect that Device 1 (202) is within range and log the detected device, and further keep track of how long Device 1 remains within range of Device 2, the time Device 1 came into proximity range, the time Device 1 is out of proximity range, and other information.

The device log file (210), for instance, may be created and used to keep the log or information of the detected devices, and the time and duration of the detection. Device 1 (202) also logs the "configuration activities" that take place. For example, Device 1 (202) may add a log entry when an application on Device 1 (202) is opened while in the proximity range of another device, e.g., Device 2 (204), visits a web site, changes their chat session status, changes wall paper, etc., for instance, in the configuration log file (212).

In addition to learning and logging the activities that take place, when Device 1 (202) detects another device, e.g., Device 2 (204), Device 1 (202) will look in its configuration log, and determine the configuration activity that occurred the last time the device was detected. If it was not detected before Device 1 (202) will perform a default action (for example, opening a notepad application for taking notes). The configuration log, or another file, may include a default action to perform when another device is detected. The default actions may be the same or different for different devices. Thus, in one embodiment, the learning of the first device's behavior while in proximity range of other one or more devices may take place concurrently or simultaneously as the actions that are performed when those one or more devices are detected to be in the proximity range.

If Device 2 (204) was detected before, Device 1 (202) might offer its user the choice of reverting back to the configuration Device 1 (202) had when Device 2 (204) was in proximity range before, perform the default actions associated with Device 2 (204) or do nothing. Device 1 can log the user's response (for instance, in user's response log 214) in this situation, and use this when a similar situation occurs in the future (i.e., it learns the user's preferences in different situations over time).

More complex learning facility could also be introduced, taking into account the time of day certain user responses are received, and what other devices are detected by Device 1 (202) at the same time as Device 2 (204) is detected (this could indicate a team meeting for example). The log files such as device log 210, configuration log 212 and user response log 214 may be stored in the device itself or stored in a remote storage device.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 3:
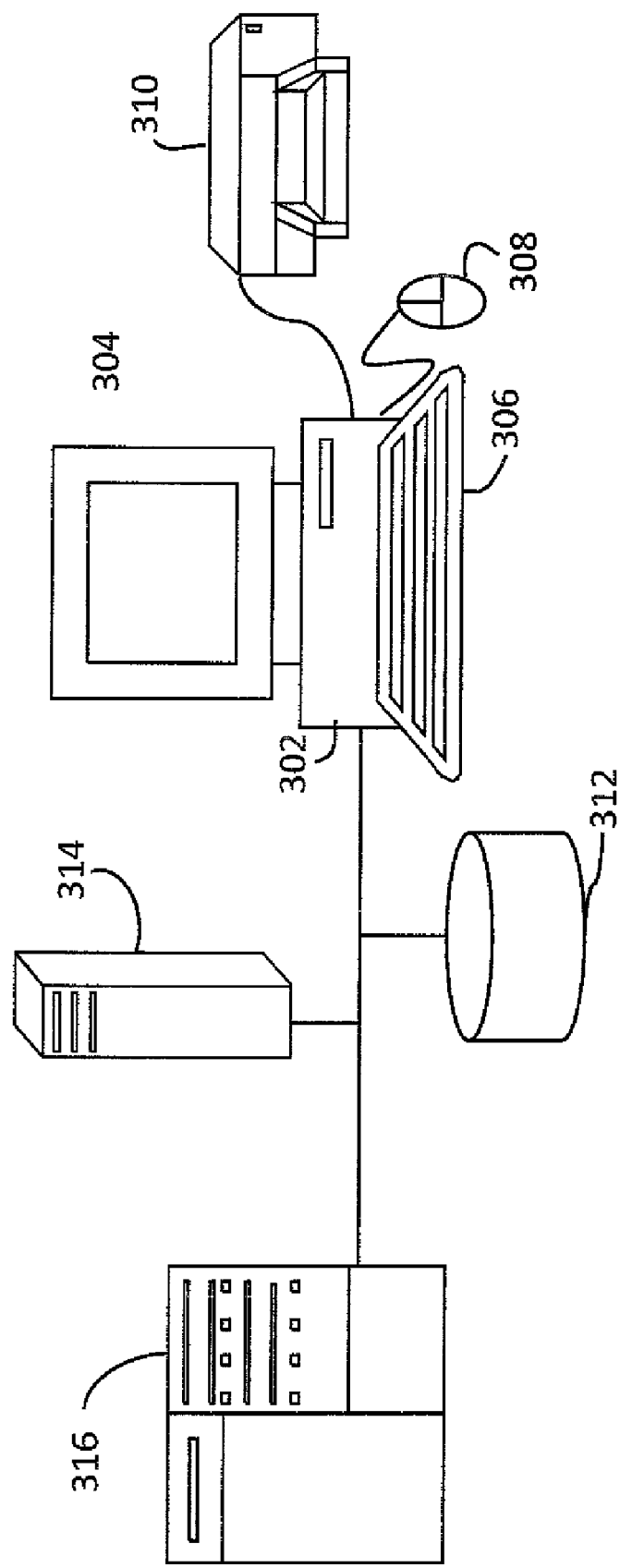
FIG. 3 illustrates an example a computer system which may carry out or execute the systems and methodologies of the present disclosure in one embodiment.

Referring now to FIG. 3, the systems and methodologies of the present disclosure may be carried out or executed in a computer system that includes a processing unit 320, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit 320 by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen 304 for presenting output displays and providing a display through which the user may input data and interact with the processing system, for instance, in cooperation with input devices such as the keyboard 306 and mouse device 308 or pointing device. The computer processing system may be also connected or coupled to one or more peripheral devices such as the printer 310, scanner (not shown), speaker, and any other devices, directly or via remote connections. The computer processing system may be connected or coupled to one or more other processing systems such as a server 310, other remote computer processing system 314, network storage devices 312, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems (e.g., 302, 314, 316), or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A computer-implemented method for proximity based collaboration, comprising:

detecting one or more devices within communication proximity of a first device;

determining one or more actions to perform in response to detecting that said one or more devices are within communication proximity;

learning behavior of the first device when said one or more devices are detected to be within communication proximity of the first device; and performing automatically said one or more actions, wherein the learning includes capturing interactions occurring between the first device and a user of the first device for a predetermined period of time while said one or more devices are detected to be within communication proximity, and wherein said one or more actions to perform are determined based on the previously captured interactions between the first device and the user of the first device.

2. The method of claim 1, wherein said one or more actions are performed within the first device.

3. The method of claim 1, wherein said one or more actions are performed external to the first device.

4. The method of claim 1, wherein the step of determining further includes:

determining said one or more actions to perform based on a default set of actions.

5. The method of claim 1, wherein the step of detecting includes employing discovery of devices within radio frequency range of communications based on a predetermined radio frequency communication protocol.

6. The method of claim 1, wherein said one or more actions include no action.

7. The method of claim 1, wherein said one or more actions include opening an application in the first device.

8. The method of claim 1, wherein said one or more actions include changing configuration of the first device.

9. The method of claim 1, wherein said one or more actions include changing behavior of the first device.

10. The method of claim 1, wherein the learning further includes the first device building a list of captured interactions occurring each time the one or more devices come into proximity of the first device over a predetermined observation period, and selecting one or more common actions in the list for automatically performing on the first device next time the one or more devices come into proximity of the first device.

11. The method of claim 10, further including filtering said one or more common actions based on one or more criteria, including time or geographic location or combinations thereof.

12. The method of claim 1, further including keeping an exclusionary list of device identifications indicating that said one or more actions should not be performed if said one or more devices are on the exclusionary list.

13. A system for proximity based smart collaboration, comprising:

a first computer device;

a radio frequency device detection module in the first device operable to detect one or more second devices within communication proximity of a first device, the first computer device further operable to determine one or more actions to perform when said one or more second devices are within communication proximity, the first computer device further operable to learn behavior of the first computer device when said one or more second devices are detected to be within communication proximity of the first computer device, and the first computer device further operable to perform said one or more actions automatically, wherein the behavior of the first computer device is learned by at least capturing interactions occurring between the first computer device and a user of the first computer device for a predetermined period of time while said one or more devices are detected to be within communication proximity, and wherein said one or more actions to perform are determined based on the previously captured interactions between the first device and the user of the first device.

14. The system of claim 13, further including:

a storage module operable to store the learned behavior of the first computer device, identifications of said one or more second devices, and configuration of the first computer device while said first computer device is within communication proximity of said one or more second devices.

15. The system of claim 14, wherein the storage module is located in the first computer device.

16. The system of claim 14, wherein the storage module is located outside the first computer device.

17. The system of claim 13, wherein said one or more actions are performed within the first computer device.

18. The system of claim 13, wherein said one or more actions are performed external to the first device.

19. The system of claim 13, wherein the first computer device determines said one or more actions to perform based on a default set of actions.

20. A non-transitory program storage device readable by a machine, tangibly embodying a program of instructions executable by the machine to perform a method of proximity based smart collaboration, comprising:

detecting one or more devices within communication proximity of a first device;

determining one or more actions to perform in response to detecting that said one or more devices are within communication proximity;

learning behavior of the first device when said one or more devices are detected to be within communication proximity of the first device; and performing said one or more actions, wherein the learning includes capturing interactions between the first device and a user of the first device for a predetermined period of time while said one or more devices are detected to be within communication proximity, and wherein said one or more actions to perform are determined based on the previously captured interactions between the first device and the user of the first device.

21. The non-transitory program storage device of claim 20, wherein said one or more actions are performed within the first device.

22. The non-transitory program storage device of claim 20, wherein said one or more actions are performed external to the first device.

23. The non-transitory program storage device of claim 20, wherein the step of determining further includes:

determining said one or more actions to perform based on a default set of actions.

24. The non-transitory program storage device of claim 20, wherein the step of detecting include employing automatic discovery of devices within radio frequency range of communications based on a predetermined radio frequency communication protocol.

* * * * *